(12) United States Patent
Pruett et al.

(10) Patent No.: US 8,083,848 B2
(45) Date of Patent: Dec. 27, 2011

(54) COMPOSITIONS COMPRISING FINE SEDIMENTARY KAOLIN AND METHODS FOR PREPARING SAME

(75) Inventors: Robert J. Pruett, Milledgeville, GA (US); Paula R. Alves, Milledgeville, GA (US)

(73) Assignee: Imerys Pigments, Inc., Roswell, GA (US)

( * ) Notice: Subject to any disclaimer, the term of this patent is extended or adjusted under 35 U.S.C. 154(b) by 0 days.

(21) Appl. No.: 11/349,213

(22) Filed: Feb. 8, 2006

(65) Prior Publication Data

US 2006/0249051 A1     Nov. 9, 2006

Related U.S. Application Data

(60) Provisional application No. 60/676,940, filed on May 3, 2005.

(51) Int. Cl.
    *C04B 14/04*      (2006.01)
    *C04B 32/24*      (2006.01)
    *C09C 1/00*      (2006.01)

(52) U.S. Cl. ........ 106/486; 106/416; 106/484; 106/485; 106/487; 106/488; 501/144

(58) Field of Classification Search .......... 106/484–488, 106/416; 501/144–149; 209/5
See application file for complete search history.

(56) References Cited

U.S. PATENT DOCUMENTS

| | | | |
|---|---|---|---|
| 3,432,030 A | 3/1969 | Olivier | |
| 3,450,257 A | 6/1969 | Cundy | |
| 3,709,709 A | 1/1973 | Torok et al. | |
| 3,808,021 A | 4/1974 | Maynard | |
| 4,017,324 A * | 4/1977 | Eggers | 106/487 |
| 4,227,920 A | 10/1980 | Chapman et al. | |
| 4,334,985 A | 6/1982 | Turner, Jr. | |
| 5,128,606 A | 7/1992 | Gate et al. | |
| 5,169,443 A * | 12/1992 | Willis et al. | 106/486 |
| 5,261,956 A * | 11/1993 | Dunaway et al. | 106/416 |
| 5,522,924 A | 6/1996 | Smith et al. | |
| 5,576,617 A | 11/1996 | Webb et al. | |
| 5,624,488 A * | 4/1997 | Forbus et al. | 106/484 |
| 5,685,900 A * | 11/1997 | Yuan et al. | 106/487 |
| 5,840,113 A * | 11/1998 | Freeman et al. | 106/487 |
| 6,007,618 A * | 12/1999 | Norris et al. | 106/487 |
| 6,197,105 B1 * | 3/2001 | Freeman et al. | 106/487 |
| 6,312,511 B1 | 11/2001 | Bilimoria et al. | |
| 6,378,703 B1 * | 4/2002 | Mathur et al. | 209/166 |
| 6,379,452 B1 | 4/2002 | Maxwell et al. | |
| 6,402,826 B1 * | 6/2002 | Yuan et al. | 106/486 |
| 6,564,199 B1 * | 5/2003 | Pruett et al. | 106/486 |
| 6,585,822 B2 | 7/2003 | Berube et al. | |
| 6,660,076 B2 | 12/2003 | Valadares et al. | |
| 7,122,080 B2 | 10/2006 | Pruett et al. | |
| 2003/0141224 A1 * | 7/2003 | Pruett et al. | 209/5 |
| 2006/0047047 A1 * | 3/2006 | Patel et al. | 524/447 |
| 2006/0086289 A1 | 4/2006 | Mathur et al. | |
| 2006/0185557 A1 | 8/2006 | Garska et al. | |
| 2007/0221092 A1 | 9/2007 | Brown et al. | |

FOREIGN PATENT DOCUMENTS

| | | | |
|---|---|---|---|
| EP | 0 528 078 | | 2/1997 |
| GB | 2 240 398 | | 7/1991 |
| WO | WO 00/32699 | * | 6/2000 |
| WO | WO 00/66510 | | 11/2000 |
| WO | WO 03/093577 | | 11/2003 |

OTHER PUBLICATIONS

Co-Pending U.S. Appl. No. 11/349,217.
Office Action dated Feb. 13, 2007, for U.S. Appl. No. 11/349,217.
Office Action dated Mar. 7, 2007, in co-pending U.S. Appl. No. 11/349,216.
Office Action dated Jul. 23, 2007, in co-pending U.S. Appl. No. 11/349,217.
Office Action dated Sep. 24, 2007, in co-pending U.S. Appl. No. 11/349,216.
Office Action dated Apr. 15, 2008 in co-pending U.S. Appl. No. 11/349, 217.
Office Action dated Jun. 11, 2008, in co-pending U.S. Appl. No. 11/349, 216.
Office Action dated Oct. 9, 2008, in co-pending U.S. Appl. No. 11/349,217.
Carneiro, B.S; Angélica R.S.; Scheller, T.; de Castro; E.A.S.; and Neves, R.F., "Mineralogical and geochemical characterization of the hard kaolin from the Capim region, Pará, northern Brazil," Cerâmica 49, 2003, pp. 237-244.
Kotschoubey, Basile; Truckenbrodt, Werner and Hieronymus, Bernard, "Deposits of Kaolin and semi-flint clay in northeastern Pará state, Brazil," Revista Brasileira de Geociências, vol. 26 (2), 1996, pp. 71-80.
Office Action dated Dec. 9, 2008, from co-pending U.S. Appl. No. 11/349,216.
Office Action dated Jan. 28, 2009, from co-pending U.S. Appl. No. 11/349,217.
Office Action dated Jun. 15, 2009, in co-pending U.S. Appl. No. 11/349,216.
Office Action issued Jan. 5, 2010, in co-pending U.S. Appl. No. 11/349,216.
Office Action issued Sep. 15, 2009, in co-pending U.S. Appl. No. 11/579,166.

* cited by examiner

*Primary Examiner* — Anthony J Green
*Assistant Examiner* — Pegah Parvini
(74) *Attorney, Agent, or Firm* — Finnegan, Henderson, Farabow, Garrett & Dunner, L.L.P.

(57) ABSTRACT

Disclosed herein are kaolin compositions, such as beneficiated fine sedimentary kaolin compositions. The beneficiated fine sedimentary kaolins may be obtained from the upper bed of the Rio Capim Kaolin deposit. The compositions may have at least one property chosen from a low iron content and low Hinckley crystallinity index, such as $Fe_2O_3$ in an amount less than about 0.8% by weight relative to the total weight of the solids content and wherein the Hinckley crystallinity index of the kaolin is less than about 0.5. Also disclosed are products obtained therefrom, such as paint and paper coating compositions.

17 Claims, 3 Drawing Sheets

US 8,083,848 B2

COMPOSITIONS COMPRISING FINE SEDIMENTARY KAOLIN AND METHODS FOR PREPARING SAME

This application claims priority to U.S. Provisional Patent Application No. 60/676,940, filed May 3, 2005.

Disclosed herein are kaolin compositions, such as beneficiated fine sedimentary kaolin compositions. The beneficiated fine sedimentary kaolins may, for example, be derived from "hard" kaolin obtained from the upper bed of the Rio Capim Kaolin deposit. The compositions may have at least one property chosen from low iron content and a low Hinckley crystallinity index. Also disclosed are methods of refining this kaolin, and products obtained therefrom, such as paint and paper coating compositions.

Kaolin is a white industrial mineral that has found use in a wide range of applications, including ceramics, paper coatings, and pigments. Kaolin is also referred to as china clay or hydrous kaolin, and contains predominantly the mineral kaolinite, together with small concentrations of various other minerals. Kaolinite is a hydrous aluminosilicate ($Al_2Si_2O_5(OH)_4$).

Kaolin clays were formed in geological times by the weathering of the feldspar component of granite. Primary kaolin clays are those which are found in deposits at the site at which they were formed. For example, kaolin clays mainly of the primary type are obtained from deposits in South West England, France, Germany, Spain, and the Czech Republic. Sedimentary kaolin clays are those which were flushed out in geological times from the granite matrix in which they were formed, and were deposited in an area remote from their site of formation, generally in a basin formed in the surrounding strata. For example, kaolin clays obtained from deposits in the Southeastern United States and from Brazil are generally of the sedimentary type. Fine sedimentary kaolins having a have a particle size distribution after degritting such that about 80% by weight of the particles have an equivalent spherical diameter of less than 2 microns (by Sedigraph) are sometimes called "hard" kaolins. Fine sedimentary kaolins can also be referred to as "hard" kaolins.

The Rio Capim Kaolin deposit contains a lower bed of soft kaolin clay that averages 10 meters thick, and an upper bed of "hard" kaolin ("RCC hard kaolin") that may be as thick as 6 to 8 meters. The hard kaolins are typically very fine and have a high content of impurities. The RCC hard kaolins can be distinguished from other hard kaolins, such as Georgia hard kaolins, by their higher titania and $Fe_2O_3$ content in combination with their small size. For example, crude Georgia hard kaolins typically will have a titania content on the order of 1.5%-2.5% and an $Fe_2O_3$ content of less than 1%. By comparison, the RCC hard kaolins can have titania levels greater than 1.5% by weight and an $Fe_2O_3$ content of at least about 1%, in some cases as high as 3%. The $Fe_2O_3$, $TiO_2$ and other discoloring impurities are typically extremely finely disseminated throughout the RCC hard clay phase as aggregates that can be difficult to disperse. SEM and other image analysis techniques have revealed that the particle size of discoloring impurities may be in the nano-size range. As mined, the RCC hard kaolins are also difficult to disperse using conventional mechanical and chemical dispersion methods, which has made processing and beneficiation of these hard kaolins difficult. For these reasons only the lower bed of soft kaolin clay is currently being processed.

It would be desirable to develop a process for obtaining a useful product from the upper hard kaolin layer.

Accordingly, there is disclosed a kaolin composition comprising a beneficiated fine sedimentary kaolin containing $Fe_2O_3$ in an amount less than about 0.8% by weight relative to the total weight of the solids content. The beneficiated fine sedimentary kaolin described herein may also exhibit a Hinckley crystallinity index of about 0.5 or less.

There is also disclosed a method of refining a kaolin comprising beneficiating a fine sedimentary kaolin to form a beneficiated fine sedimentary kaolin to achieve at least one of these properties.

In one embodiment, a "beneficiated" kaolin is a kaolin that has been subjected to at least one process chosen from dispersion, blunging, selective flocculation, ozone bleaching, classification, magnetic separation, chemical leaching, froth flotation, and dewatering of the kaolin, as disclosed herein.

Aside from the subject matter discussed above, the present disclosure includes a number of other exemplary features such as those explained hereinafter. It is to be understood that both the foregoing description and the following description are exemplary only.

The accompanying figures are incorporated in and constitutes a part of this specification.

Figure 1:
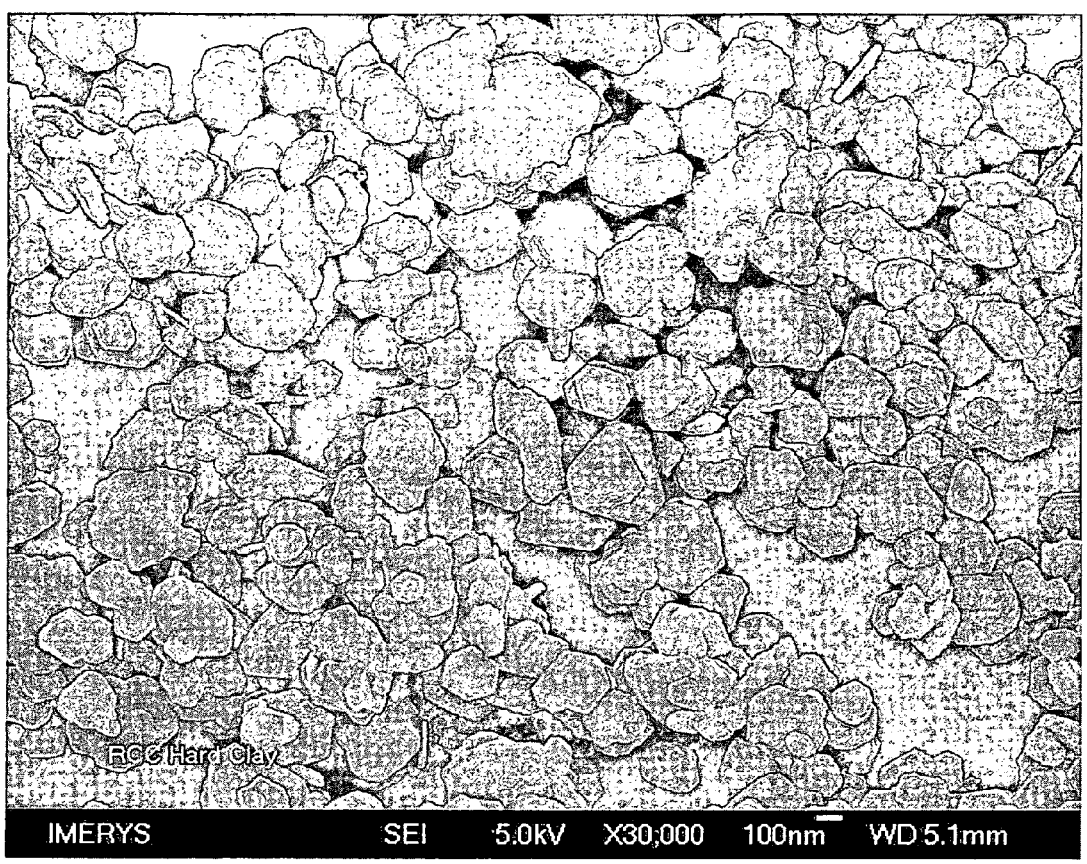
FIG. 1 is a scanning electron micrograph of a beneficiated fine sedimentary kolin, which as been refined as disclosed herein.

As previously described, in one embodiment, the beneficiated fine sedimentary kaolin described herein may have a Hinckley crystallinity index of about 0.5 or less. In another embodiment, the Hinckley crystallinity index of the beneficiated fine sedimentary kaolins may be less than about 0.4, less than about 0.3, or less than about 0.2.

The Hinckley crystallinity index is a measure of the degree of crystallinity perfection in a kaolin sample. See Hinckley, D. N. "Variability in 'Crystallinity' Values Among the Kaolin Deposits of the Coastal Plain of Georgia and South Carolina," *Clays and Clay Minerals*, II, 229-235, *Proceedings of the 11th National Conference on Clays and Clay Minerals*, Pergamon Press, NY, 1963. The lower the Hinckley crystallinity index, the lower the degree of crystalline imperfections.

In addition, the beneficiated fine sedimentary kaolins disclosed herein have a low iron impurity content. For example, in one embodiment, the beneficiated fine sedimentary kaolins may contain $Fe_2O_3$ in an amount less than about 0.8%, less than about 0.7%, less than about 0.6%, less than about 0.5%, or less than about 0.4% by weight relative to the total weight of the solids content.

The beneficiated fine sedimentary kaolins disclosed herein have a fine particle size. Particle sizes, and other particle size properties referred to in the present disclosure, such as particle size distribution (psd) are measured using a SEDIGRAPH 5100 instrument as supplied by Micromeritics Corporation. The size of a given particle is expressed in terms of the diameter of a sphere of equivalent diameter that sediments through the suspension, i.e., an equivalent spherical diameter or "esd." The median particle size, or $d_{50}$ value, is the value at which 50% by weight of the particles have an esd less than that $d_{50}$ value.

Particle sizes and other particle size properties may also be measured using a Malvern Mastersizer Plus. Malvern measurements are based on laser diffraction, whereas SEDI- GRAPH measurements are based on X-ray measurement of sedimenting particles. Malvern methods can be used to measure particle sizes with a lower limit of 0.05 μm.

All particle size data measurements reported herein, including in the examples, were taken in the above-described manner, with measurements made in water at the standard temperature under ambient air. All percentages and amounts expressed herein are by weight.

In one embodiment, the beneficiated fine sedimentary kaolin has a median particle size (d50) of less than about 0.30 μm, less than about 0.25 μm, less than about 0.20 μm, or less than about 0.15 μm.

The particle size distribution (psd) of a particulate product may be determined by measuring the sedimentation speeds of the dispersed particles of the particulate product under test through a standard dilute aqueous suspension using a SEDIGRAPH™, e.g., SEDIGRAPH 5100, obtained from Micromeritics Corporation, USA. The SEDIGRAPH graphically records the percentage by weight of particles having an esd less than a particular esd value versus that esd value.

In one embodiment, the beneficiated fine sedimentary kaolin has a particle size distribution such that at least about 97%, at least about 98%, at least about 99%, or at least about 99.9% of the kaolin has a particle size less than about 1 μm. The beneficiated fine sedimentary kaolin may have a particle size distribution such that at least about 96% of the kaolin has a particle size less than about 0.5 μm. The beneficiated fine sedimentary kaolin may also have a particle size distribution such that at least about 65%, or at least about 68% of the kaolin has particle size less than about 0.25 μm. In another embodiment, the beneficiated fine sedimentary kaolin may have a particle size distribution such that at least about 50% of the kaolin has a particle size less than about 0.18 μm.

In one embodiment, the disclosure provides a composition comprising a beneficiated fine sedimentary kaolin having a shape factor less than about 7. "Shape factor" as used herein is a measure of an average value (on a weight average basis) of the ratio of mean particle diameter to particle thickness for a population of particles of varying size and shape as measured using the electrical conductivity method and apparatus described in GB-A-2240398/U.S. Pat. No. 5,128,606/EP-A-0528078, and U.S. Pat. No. 5,576,617, which are incorporated herein by reference in their entirety, and using the equations derived in these patent specifications.

In one embodiment, the beneficiated fine sedimentary kaolin composition has a shape factor less than about 7. In another embodiment, the shape factor may be less than about 6.5, less than about 6, less than about 5.5, less than about 5, less than about 4.5, or less than about 4.

In one embodiment, the beneficiated fine sedimentary kaolin has a high GE brightness of at least about 86, at least about 87, at least about 88, at least about 89, or at least about 90.

In one embodiment, a source of the beneficiated fine sedimentary kaolin, is a fine sedimentary kaolin obtained from the Rio Capim kaolin deposit, e.g., an "RCC fine sedimentary kaolin." RCC fine sedimentary kaolins can have a high $TiO_2$ and $Fe_2O_3$ content. In one embodiment, the $TiO_2$ can be present in the fine sedimentary kaolin in an amount of at least about 2% by weight relative to the total weight of solids content, such as an amount of at least about 2.5% by weight relative to the total weight of solids content. In one embodiment, $Fe_2O_3$ is present in the fine sedimentary kaolin in an amount of at least about 1.2% by weight relative to the total weight of solids content, such as an amount of at least about 1.5% by weight relative to the total weight of solids content.

One embodiment disclosed herein is a method of refining a kaolin, comprising:
beneficiating a fine sedimentary kaolin to form a beneficiated fine sedimentary kaolin containing $Fe_2O_3$ in an amount less than about 0.8% by weight relative to the total weight of the solids content, and wherein the kaolin exhibits a Hinckley crystallinity index of about 0.5 or less.

The beneficiating described herein may comprise at least one process chosen from dispersion, blunging, selective flocculation, ozone bleaching, classification, magnetic separation, and chemical leaching of the kaolin.

In one embodiment, the fine sedimentary kaolin may be processed by dispersing the kaolin via a slurry comprising the fine sedimentary kaolin, the slurry comprising:
kaolin having a median particle size less than about 0.5 μm;
at least one anionic organic dispersant; and
at least one inorganic dispersant,
wherein the slurry has a solids content of at least 70% by weight of kaolin, the kaolin containing $TiO_2$ in an amount of at least about 1.5% by weight relative to the total weight of the solids content, and $Fe_2O_3$ in an amount of at least about 1% by weight relative to the total weight of the solids content.

In one embodiment, the dispersion is effective at a high pH, such as a pH of at least about 9, a pH of at least about 9.5, a pH of at least about 10, or a pH of at least about 10.5, or even a pH of at least about 11. The high pH can be obtained by adding at least one pH regulator, such as pH regulators chosen from sodium hydroxide, ammonium hydroxide, sodium carbonate (soda ash), and potassium carbonate.

The dispersing agent in each case may be selected from dispersing agents known in the art for the dispersion of particulate minerals in an aqueous medium. In one embodiment, the at least one anionic organic dispersant is chosen from anionic organic polyelectrolytes. Exemplary polyelectrolytes include those comprising a polycarboxylate. The polycarboxylate can be chosen from homopolymers and copolymers containing at least one monomer residue (the portion of the polymer derived from the monomer) chosen from vinyl and olefinic groups substituted with at least one carboxylic acid group, and water soluble salts thereof. The at least one monomer residue can be derived from monomers chosen from acrylic acid, methacrylic acid, itaconic acid, chronic acid, fumaric acid, maleic acid, maleic anhydride, isocrotonic acid, undecylenic acid, angelic acid, and hydroxyacrylic acid.

In one embodiment, the polycarboxylate can have a number average molecular weight no greater than about 20,000, as measured by the method of gel permeation chromatography using a low angle laser light scattering detector. In another embodiment, the polycarboxylate has a number average molecular weight ranging from about 700 to about 10,000.

In one embodiment, the at least one anionic dispersant is chosen from partially and fully neutralized sodium polyacrylate. In another embodiment, the at least one anionic dispersant is chosen from partially and fully neutralized maleic anhydride copolymer.

The at least one inorganic dispersant may be chosen from phosphates and silicates. Exemplary inorganic dispersants include those chosen from sodium hexametaphosphate, tetrasodium pyrophosphate, tetrapotassium pyrophosphate, and sodium silicate.

The at least one anionic organic dispersant and at least one inorganic dispersant is useful for dispersing fine sedimentary kaolin, such as the fine sedimentary kaolin having the properties described above. In some cases it may also be necessary to subject the kaolin to a relatively high mixing energy in order to break up compacted masses of fine kaolin particles from the fine sedimentary kaolin. For example, the fine sedimentary kaolin can be blunged and then further dispersed with a relatively high energy mill such as a Kady® Mill (Kady International). Other potential high energy mixing systems may also be useful in the present invention, such as a Cowles® Dissolver.

Once the fine sedimentary kaolin has been adequately dispersed, it can be subjected to one or more of beneficiation steps to remove undesirable impurities, such as magnetic separation, chemical leaching, froth flotation, selective flocculation, and ozone bleaching.

For example, the kaolin may be passed as a suspension through a high intensity magnetic separator to remove iron containing impurities. One example of magnetic separation is described in U.S. Pat. No. 5,522,924, in which the disclosure at col. 2, lines 20-29, col. 5, lines 7-13, and col. 8, lines 17-20 is incorporated herein by reference for its teachings of magnetic separation. A standard high intensity wet magnetic separator can be used. This process can also result in a brightness gain ranging from about 0.1 to about 10.0 units.

Also optionally, the kaolin can be subjected to a selective flocculation process in which the impurities are flocced out of suspension while the kaolin clay remains in suspension. In one example, a high molecular weight anionic polymer having a molecular weight in excess of one million, or a molecular weight in the range of about 10 to about 15 million can be used. The anionic polymer can be a copolymer of a polyacrylamide or polyampholyte.

The refined clay slurry may be ozoned, leached (bleached), and/or filtered. The clay may then be acid flocculated and dried, or may be redispersed in a makedown tank and alternately spray dried. Details of a selective flocculation process can be found in U.S. Pat. No. 4,227,920 to Chapman and Anderson, in which the disclosure at col. 3, lines 19-34 and at col. 4, lines 3-16 is incorporated herein by reference for its teachings of a selective flocculation process. In addition, U.S. Pat. No. 5,685,900 to Yuan et al., includes a description of an ozonation process, in which the disclosure at col. 3, line 62 to col. 4, line 7, col. 5, lines 12-26 is incorporated herein by reference for its teachings of an ozonation process.

An aqueous suspension of kaolin clay may be subjected to a froth flotation treatment operation to remove titanium containing impurities in the froth. The slurry can be conditioned with an oleic acid to coat the air bubbles produced in the float cells. The titania minerals adhere to the air bubbles and are floated out of the kaolin slurry. An example of such a flotation process is described in U.S. Pat. No. 3,450,257, to Cundy, in which the disclosure at col. 2, line 15 to col. 4, line 12 is incorporated herein by reference for its teaching of a flotation process. This process can result in an improved brightness in the kaolin pigment, e.g., a GE brightness gain ranging from about 0.1 to about 10.0 units.

Chemical leaching can be performed, for example, with a reductive leaching agent such as sodium hydrosulfite. The leaching agent may be added in a dose ranging from, for example, about 0.5 to 5.0 pounds per ton of kaolin, with certain embodiments containing less than about 4 pounds per ton on a dry basis. Other suitable reductive bleaching agents, such as formamidine sulphinic acid, sodium borohydride and sodium bisulfite, may also be employed. Reductive bleaching using sodium hydrosulfite can be carried out at an acidic pH, typically in the range of 2.0 to 4.0.

In one embodiment, the kaolin can be classified prior to and/or after the at least one beneficiation step. The classifying may be accomplished by using any method known to those of ordinary skill in the art. Exemplary methods include the use of screens, centrifuges (e.g., bird centrifuge), cyclones, and air classifiers. Screening can be performed with screens of a desired mesh, such as a 325 mesh screen. Other methods include gravity sedimentation or elutriation, any type of hydrocyclone apparatus, or, for example, a solid bowl decanter centrifuge, and disc nozzle centrifuge. The resultant coarse fraction may be discarded, used as a separate product or, for example, may be directed back to the blend tank as an auxiliary source for the coarse kaolin used in the method disclosed herein.

The classified kaolin suspension may be further treated to improve one or more of its properties. For example, high energy liquid working, e.g., using a high speed mixer, may be applied to the product in slurry form, and subsequent redispersion in an aqueous medium, e.g. during makedown of a coating composition. The classified kaolin suspension may also optionally be dewatered in one of the ways well known in the art, e.g. filtration, centrifugation, evaporation and the like.

In one embodiment, beneficiating may comprise the processes of dispersion, blunging, selective flocculation, ozone bleaching, classification, magnetic separation, and chemical leaching of the kaolin.

Another embodiment of a method for refining kaolin is described herein. First, the crude slurry can be blunged with a high energy blunger, or alternatively blunged by any other process known in the art. During the blunging stage, the pH of the slurry can be increased to at least 10 by adding sodium hydroxide or ammonium hydroxide as pH regulators.

The slurry can then be degritted, such as by passing the slurry through a screen to remove +325 mesh material (grit) from clay. The kaolin particles in the screened material can be selectively flocculated from discoloring impurities in a settling tank by addition of low anionicity and high molecular weight polymer with at least 1 million molecular weight at high pH (pH>11) to remove the fine titania impurities from the thickener overflow.

Ozone bleaching can be performed to leach out any organic impurities that may be found in crude and to destroy the polymer that is used for the selective flocculation.

The clay can be classified at 92-98% less than 2 µm to remove any coarse discolored titania and iron oxide impurities.

A high intensity magnetic separation can be performed, followed by chemical leaching to the selectively flocculated, ozone bleached and classified kaolin product to remove iron oxide impurities and to further enhance product brightness.

The final product, which may be a dispersed and beneficiated kaolin, can have a relatively high GE brightness such as at least about 88, at least about 89, at least about 90 or even at least about 91.

The final product can also have reduced impurity content, such as a titania content of no more than about 1.0%, no more than about 0.5%, or no more than about 0.25%. The $Fe_2O_3$ content of the final product can be no more than about 1%, or no more than about 0.5%.

The kaolin refined from fine sedimentary kaolin can be very fine with a particle size distribution such that at least about 95% of the particles has an esd less than 2 µm, such as at least about 97%, or even at least about 98% less than 2 µm, or a $d_{50}$ of less than about 0.5 µm (i.e., 50% of the particles have a particle size less than about 0.5 µm), such as a $d_{50}$ of less than about 0.35 µm, or a $d_{50}$ of less than about 0.25 µm. In another embodiment, at least about 92% of the dispersed and beneficiated kaolin composition has a particle size of less than about 1 µm.

In one embodiment, the kaolin refined from fine sedimentary kaolin can also have dynes rheology. A kaolin having dynes rheology can be potentially useful in any of a number of applications such as in paints or in paper coatings.

Another embodiment of the present disclosure provides products comprising the kaolin refined from the fine sedimentary kaolin, such as paints, paper coatings, and plastics.

Paint compositions can comprise the refined kaolin disclosed herein, and optionally at least one ingredient chosen from thickeners, dispersants, and biocides. The paint composition may also comprise at least one additional ingredient chosen from a polymeric binder, a primary pigment such as titanium dioxide, a secondary pigment such as calcium carbonate, silica, nepheline syenite, feldspar, dolomite, diatomaceous earth, and flux-calcined diatomaceous earth. For water-based versions of such paint compositions, any water-dispersible binder, such as polyvinyl alcohol (PVA) and acrylics may be used. Paint compositions disclosed herein may also comprise other conventional additives, including, but not limited to, surfactants, thickeners, defoamers, wetting agents, dispersants, solvents, and coalescents.

Paper coatings disclosed herein can include, in addition to the refined kaolin as described above, materials generally used in the production of paper coatings and paper fillers. The compositions can include a binder and a pigment, such as $TiO_2$. The coatings may optionally include other additives, including, but not limited to, dispersants, cross linkers, water retention aids, viscosity modifiers or thickeners, lubricity or calendering aids, antifoamers/defoamers, gloss-ink hold-out additives, dry or wet rub improvement or abrasion resistance additives, dry or wet pick improvement additives, optical brightening agents or fluorescent whitening agents, dyes, biocides, leveling or evening aids, grease or oil resistance additives, water resistance additives and/or insolubilizers.

Any art recognized binder may be used in the compositions and products disclosed herein. Exemplary binders include, but are not limited to, adhesives derived from natural starch obtained from a known plant source, for example, wheat, corn, potato or tapioca; and synthetic binders, including styrene butadiene, acrylic latex, vinyl acetate latex, or styrene acrylic, casein, polyvinyl alcohol, polyvinyl acetate, or mixtures thereof.

Paper coatings have very different binder levels depending upon the type of printing to be used with the coated paper product. Appropriate binder levels based upon the desired end product would be readily apparent to the skilled artisan. Binder levels are controlled to allow the surfaces to receive ink without disruption. The latex binder levels for paper coatings generally range from about 3% to about 30%. In one aspect, the binder is present in the paper coating in an amount ranging from about 3% to about 10%. In another aspect, the binder is present in the coating in an amount ranging from about 10% to about 30% by weight.

Other applications for the kaolin compositions disclosed herein include plastics and synthetic rubbers, antiblock, caulks, sealants, adhesives, and fillers and extenders for paint and paper.

EXAMPLES

Example 1

This Example describes a method for refining RCC kaolin with ozonation and magnetic separation processes.

Samples 1 and 2 were subjected to the following processes:
The crude clay slurry was blunged for 15 minutes @ 70% solids with a high energy, 4 L capacity, Waring blender using 15 pounds/ton sodium hexametaphosphates and 10 pounds/ton sodium polyacrylate (C-211). NaOH was added during the blunging stage to achieve a pH of approximately 10.

The blunged crude kaolin had the following PSD:

| PSD | 15 min. blunging using (4-L capacity) Waring blender | | | | |
|---|---|---|---|---|---|
| <10 μm | <5 μm | <2 μm | <1 μm | <0.5 μm | <0.25 μm |
| 94.5% | 90.4% | 82.3% | 75.3% | 64.4% | 42.1% |

The blunged crude kaolin also had the following properties, where a, b, and L are color component values on the color space scale as measured by a Technibrite TB-1C instrument; "+a" is a measure of red tint; "−a" is a measure of green tint; "+b" is a measure of yellow tint; "−b" is a measure of blue tint; and "L" is a measure of whiteness:

| GE Brightness | L | A | b | $TiO_2$ | $Fe_2O_3$ |
|---|---|---|---|---|---|
| 69.82 | 86.85 | 3.53 | 5.61 | 1.761 | 0.963 |

The slurry was then diluted to approximately 40% solids and screened to remove +325 mesh material (grit) from clay, followed by Kady® Mill (Kady International) processing for 15 minutes.

The kaolin particles in the screened material were selectively flocculated from discoloring impurities in a settling tank by the addition of a high molecular weight, low anionicity, co-polymer of acrylic acid/acrylamide at a pH of approximately 11.5 to remove fine titania impurities from the thickener overflow.

Ozone bleaching was performed to leach out any organic impurities that may be found in crude kaolin and to destroy the polymer that is used for the selective flocculation. After ozone bleaching, the kaolin was classified such that 92% to 98% of the particles were finer than 2 μm. Classification was carried out using a laboratory centrifuge to achieve the desired particle size cut. Magnetic separation was performed for 2.5 minutes retention time with a total cycle time of 10 min. The kaolin was then chemically leached with 2-6 pounds/ton of sodium hydrosulfite ($Na_2S_2O_4$) to remove soluble discolored impurities (i.e. iron oxide) from clay.

For Sample 1, all the dispersants were present during the blunging. A pH of approximately 10 was maintained by adding 0.1 mL NaOH every 5 minutes during the blunging process. For Sample 2, half the total amount of the dispersants were present at the start of the blunging process. The remaining 50% of dispersants were added halfway through blunging while maintaining the pH as described for Sample 10.

Table I shows the particle size distribution data for Samples 1 and 2 after each beneficiation stage.

TABLE I

| Sample | 10 μm | 5 μm | 2 μm | 1 μm | 0.5 μm | 0.25 μm |
|---|---|---|---|---|---|---|
| #1 Kady mill product | 97.6 | 94.2 | 88.1 | 81.5 | 71.2 | 48.5 |
| #2 Kady mill product | 97.1 | 94.1 | 87.7 | 81.2 | 71.1 | 46.9 |
| #1 Ozone product | 97.3 | 94.3 | 87.4 | 80.8 | 70.6 | 47.1 |
| #2 Ozone product | 97.4 | 94.7 | 87.5 | 80.8 | 70.6 | 47.1 |
| #1 Class. product | 99.9 | 99.8 | 97.3 | 91.5 | 80.2 | 53.9 |
| #2 Class. product | 100.0 | 100.0 | 97.9 | 92.2 | 80.8 | 55.9 |

TABLE I-continued

| Sample | 10 μm | 5 μm | 2 μm | 1 μm | 0.5 μm | 0.25 μm |
|---|---|---|---|---|---|---|
| #2 Filter slip | 100.0 | 100.0 | 98.8 | 94.8 | 85.4 | 54.8 |
| #2 Spray dried product | 99.8 | 99.2 | 98.1 | 93.9 | 84.1 | 54.1 |

Table II shows optical property data for Samples 1 and 2.

TABLE II

| Sample | | Brightness | L | a | b |
|---|---|---|---|---|---|
| #1 | Kady mill product | 73.03 | 88.48 | 3.19 | 4.61 |
| | Floc. Product | 77.47 | 90.22 | 2.96 | 3.47 |
| | Ozone product | 77.15 | 90.02 | 3.06 | 3.45 |
| | Class. Product | 79.19 | 91.25 | 3.01 | 3.52 |
| | Class. Rejects | 63.92 | 82.43 | 3.62 | 3.78 |
| | Magnetic Separation Product | | | | |
| | As is | 89.10 | 96.43 | 0.23 | 3.32 |
| | w/ 2#/T $Na_2S_2O_4$ | 89.76 | 96.58 | 0.21 | 3.05 |
| | w/ 4#/T $Na_2S_2O_4$ | 90.59 | 96.87 | −0.07 | 2.85 |
| | w/ 6#/T $Na_2S_2O_4$ | 90.58 | 96.86 | −0.06 | 2.83 |
| #2 | Kady mill product | 72.46 | 88.23 | 3.32 | 4.75 |
| | Floc. Product | 77.47 | 90.29 | 3.02 | 3.57 |
| | Ozone Product | 77.35 | 90.19 | 3.03 | 3.52 |
| | Class. Product | 78.85 | 91.08 | 3.05 | 3.59 |
| | Magnetic Separation Product | | | | |
| | As is | 88.75 | 96.14 | 0.38 | 3.16 |
| | w/ 2#/T $Na_2S_2O_4$ | 90.25 | 96.77 | 0.05 | 2.97 |
| | w/ 4#/T $Na_2S_2O_4$ | 90.64 | 96.91 | −0.02 | 2.86 |
| | w/ 6#/T $Na_2S_2O_4$ | 90.57 | 96.87 | −0.08 | 2.87 |
| | Spray dryer product | 90.29 | 96.74 | 0.06 | 2.95 |

Table III shows the impurities present in the final product for Sample 1.

TABLE III

| Sample | $Al_2O_3$ (%) | $K_2O$ (%) | MgO (%) | $SiO_2$ (%) | $Na_2O$ (%) | $Fe_2O_3$ (%) | $TiO_2$ (%) | $P_2O_5$ (%) | CaO (%) | Ba (%) | S (%) | LOI[1] (%) | Total (%) |
|---|---|---|---|---|---|---|---|---|---|---|---|---|---|
| Sample #1 | 39.13 | <0.02 | <0.03 | 44.13 | 0.06 | 0.50 | 0.69 | <0.1 | <0.02 | <0.03 | 0.07 | 14.67 | 99.2 |

[1]LOI = loss on ignition

Table IV shows the particle size distribution data for the classified final product, the filter slip product, and the spray dried product. Also shown in this table are the values of low-shear Brookfield (#2 spindle @20 rpm) and Hercules viscosities (Bob A @4,400 rpm) of final product at 70% solids containing slurry.

TABLE IV

| Particle Size | Classified Final Product | Filter Slip Product | Spray Dried Product |
|---|---|---|---|
| <10 μm | 99.9 | 100.0 | 99.8 |
| <5 μm | 99.8 | 100.0 | 99.2 |
| <2 μm | 97.3 | 98.8 | 98.1 |
| <1 μm | 91.5 | 94.8 | 93.9 |
| <0.5 μm | 80.2 | 85.4 | 84.1 |
| <0.25 μm | 53.9 | 54.8 | 54.1 |
| $d_{30}$, μm | 0.13 | 0.15 | 0.14 |
| $d_{50}$, μm | 0.22 | 0.23 | 0.23 |
| $d_{70}$, μm | 0.38 | 0.34 | 0.35 |
| Steepness ($d_{30}/d_{70}$) | 34 | 43 | 41 |
| Shape Factor | 3.1 | — | — |
| BET, $m^2/g$ | — | — | 17.9 |
| Brookfield viscosity @70% solids, #2 spindle @20 rpm | — | — | 208 cps |
| Hercules viscosity @70% solids, Bob A @4,400 rpm | — | — | 6.4 dynes |
| Overall Clay Recovery, % | 60.7% | — | — |

It can be seen from Tables II to IV above that the processes outlined in this Example provides a kaolin product from the Rio Capim deposit that is low in $Fe_2O_3$ and $TiO_2$ impurities having a very fine particle size. The final product obtained had 0.69% titania, 0.5% iron oxide and a GE brightness greater than 90.0 and at least 90.6. In addition, the clay product had a particle size of at least 97% less than 2 μm (in Table VII, at least 98% of the particles having a particle size less than about 1 μm) and the final clay slurry had dynes rheology.

Example 2

This example describes physical properties of refined RCC fine sedimentary "hard" clay, and compares them to physical properties of related clays.

Table V lists brightness and psd values of blunged and degritted RCC hard clay where the blunging and degritting was performed as described in Example 1.

TABLE V

| | Minimum | Maximum | Average |
|---|---|---|---|
| GE Brightness | 66.0 | 72.5 | 69.3 |
| PSD % < 2 μm | 78.6 | 90.5 | 82.8 |
| PSD % < 1 μm | 73.1 | 84.7 | 77.1 |
| PSD % < 0.5 μm | 64.9 | 77.3 | 69.5 |
| PSD % < 0.25 μm | 37.2 | 57.1 | 48.8 |

Table VI is a comparison of the impurity content and Hinckley crystallinity index values of four blunged and degritted fine clays: RCC fine sedimentary (hard) clay (inventive); a commercially available Jari region clay produced by CADAM under the tradename "Amazon"; Huberlux®, a fine East Georgia kaolin commercially available from Huber; and a fine East Georgia clay currently (indicated in Table 7).

TABLE VI

| Blunged & Degritted Product | RCC hard clay (RCC, Brazil) | Amazon ® (Jari, Brazil) | Huberlux ® (Georgia) | fine platy (Georgia) |
|---|---|---|---|---|
| $TiO_2$ (%) | 1.75-1.95 | <1.7 | 1 to 3.5** (average ~2) | 1 to 3.5** (average ~2) |
| $Fe_2O_3$ (%) | 0.8 to >3.8 | 1.8 to >2.3 | 0.8 to 2.1** (average ~1.8) | 0.8 to 2.1** (average ~1.8) |
| Hinckley Index | 0.2 to 0.4 (total range <0.6) | 0.2 to 0.4 | <0.5 | *** |

The beneficiated products of the four fine clays, described in Table VI after blunging and degritting, are compared in Table VII. The sample labeled "RCC soft clay" is classified to 95-98%<2 µm.

TABLE VII

| Beneficiated Product | RCC hard clay (inventive) (Brazil) | Amazon ® (Jari, Brazil) | Huberlux ® (Georgia) | fine platy (Georgia) | RCC soft clay (Brazil) |
|---|---|---|---|---|---|
| GE Brightness | 90.1-92.4 | 88.6-91.1 | 90.5-91.2 | 90.0-90.7 | 91.2-91.6 |
| $TiO_2$ (%) | <0.5* (0.41**) | 0.3-1.3 | <0.7* (0.4**) | 0.8-0.9 | 0.46-0.58 |
| $Fe_2O_3$ (%) | 0.5-0.6* (0.51**) | ≧2 | 0.9-1.1* (1.0**) | 0.8-1.2 | 0.46-0.51 |
| SEDIGRAPH Data | | | | | |
| PSD % <1 µm | 100 | 97-100 | 98-99 | 88-89 | 81-89 |
| PSD % <0.5 µm | 96-98 | 88-93 | 92-94 | 73-77 | 53-65 |
| PSD % <0.25 µm | 68-72 | 48-60 | 66-69 | 43-50 | 23-30 |
| $d_{50}$ | 0.16-0.18 | 0.21-0.24 | ~0.17 | 0.25-0.29 | |
| Steepness | 44.2 | 44.7-47.3 | 38-39 | 35-38 | n.a. |
| BET Surface Area (m²/g) | 19.2 | 16-18 | 22-23 | 20-23 | 10.6-12.9 |
| Shape Factor | <4 | 79 | 8-10 | 31-36 | 11.8-14.3 |
| Malvern Data | | | | | |
| Malvern $d_{50}$ | 0.28 | 0.25 | 0.22 | n.a. | 0.31-0.34 |
| Malvern Steepness | 69.7 | 51.4 | 48.6 | n.a. | 36.1-41.2 |
| Hinckley Index | 0.37 | 0.45 | 0.52 | n.a. | 1.21-1.35 n = 4*** |

*average values
**actual measured value
***n refers to the number of samples.

It can be seen from the data of Table VII that the inventive hard kaolin clay provides a kaolin product low in $TiO_2$ and $Fe_2O_3$ impurities, and a finer kaolin particle size. The steepness of the inventive kaolin also has a comparably high value whereas the shape factor is very low, i.e., less than about 4.

Figure 2:
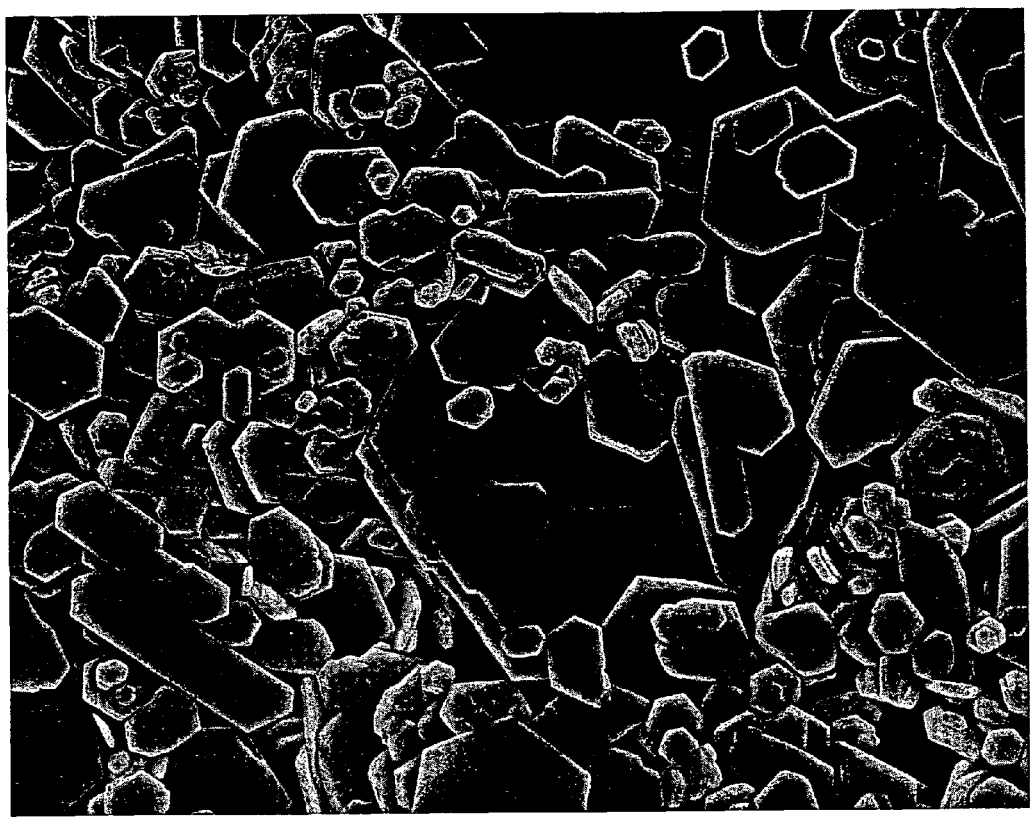
FIG. 2 is a scanning electron micrograph of a prior art Rio Capim clay commercially available from PPSA under the trade name "Paraprint."
Figure 3:
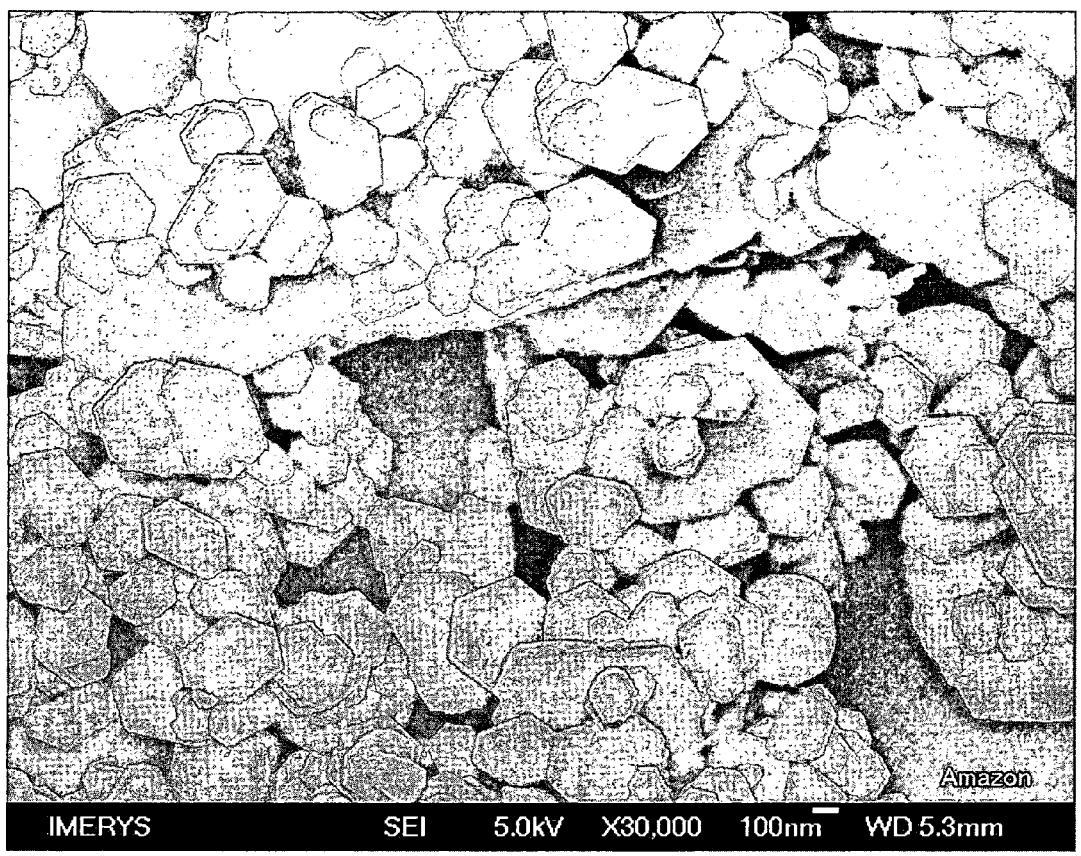
FIG. 3 is a scanning electron micrograph of a prior art clay from the Jari region of the Amazon Basin in Brazil, produced by CADAM under the trade name "Amazon."

The scanning electron micrograph (SEM) of the inventive fine sedimentary kaolin (shown in FIG. 1) was compared with the SEM of a prior art Rio Capim region clay sold by PPSA under the trade name Paraprint (FIG. 2), and the prior art Jari region clay, sold by CADAM under the trade name Amazon, described above (FIG. 3). It can be seen that the inventive fine sedimentary kaolin has a thicker and blockier shape compared to the prior art kaolins due to the low shape factor.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composition comprising a beneficiated fine sedimentary kaolin, the kaolin containing $Fe_2O_3$ in an amount less than 0.8% by weight relative to the total weight of the solids content, exhibiting a Hinckley crystallinity index of 0.5 or less, and wherein the $d_{50}$ of the beneficiated fine sedimentary kaolin ranges from 0.25 µm to 0.5 µm.

2. The composition according to claim 1, wherein the beneficiated fine sedimentary kaolin comprises beneficiated Rio Capim fine sedimentary kaolin.

3. The composition according to claim 1, wherein the $Fe_2O_3$ is present in an amount less than about 0.6% by weight relative to the total weight of the solids content.

4. The composition according to claim 1, wherein the $Fe_2O_3$ is present in an amount less than about 0.4% by weight relative to the total weight of the solids content.

5. The composition according to claim 1, wherein the Hinckley crystallinity index is less than about 0.4.

6. The composition according to claim 1, wherein the Hinckley crystallinity index is less than about 0.2.

7. The composition according to claim 1, wherein the beneficiated fine sedimentary kaolin has a particle size distribution such that at least about 98% of the kaolin has a particle size less than about 1 µm.

8. The composition according to claim 1, wherein the beneficiated fine sedimentary kaolin has a particle size distribution such that at least about 99% of the kaolin has a particle size less than about 1 μm.

9. The composition according to claim 1, wherein the beneficiated fine sedimentary kaolin has a particle size distribution such that at least about 96% of the kaolin has a particle size less than about 0.5 μm.

10. The composition according to claim 1, wherein the beneficiated fine sedimentary kaolin has a GE brightness of at least about 86.

11. The composition according to claim 10, wherein the GE brightness is at least about 90.

12. The composition according to claim 1, wherein the beneficiated fine sedimentary kaolin has a shape factor of less than about 5.

13. The composition according to claim 12, wherein the beneficiated fine sedimentary kaolin has a shape factor of less than about 4.

14. A paint composition comprising the composition according to claim 1.

15. A paper coating composition comprising the composition according to claim 1.

16. The composition according to claim 1, wherein the beneficiated fine sedimentary kaolin has a shape factor of less than about 7.

17. The composition according to claim 1, wherein the beneficiated fine sedimentary kaolin has a particle size distribution such that at least about 97% of the kaolin has a particle size less than about 1 μm.

* * * * *